US004001715B2

United States Statutory Invention Registration [19]

[11] Reg. Number: H1715

[45] Published: Apr. 7, 1998

Longeat

[54] PROCESS AND DEVICE FOR THE MANUFACTURE OF A STRING FOR STRINGING TENNIS RACKETS OR THE LIKE AND STRING RESULTING THEREFROM

[75] Inventor: Gerard Longeat, Lyons, France

[73] Assignee: Babolat VS, Lyons, France

[21] Appl. No.: 695,965

[22] Filed: Aug. 13, 1996

[51] Int. Cl.[6] ..... D02G 3/36

[52] U.S. Cl. ..... 57/7

[58] Field of Search ..... 57/296, 297, 233, 57/234, 250, 251; 428/357, 364, 373, 374; 156/244.12, 244.23, 166, 148; 264/136, 137

[56] References Cited

U.S. PATENT DOCUMENTS

| | | | |
|---|---|---|---|
| 2,735,258 | 2/1956 | Crandall | 57/140 |
| 3,738,096 | 6/1973 | Crandall | 57/149 |
| 3,885,380 | 5/1975 | Hacker | 57/162 |
| 3,972,304 | 8/1976 | Boucher | 118/44 |
| 4,289,465 | 9/1981 | Killmeyer et al. | 425/111 |
| 4,297,835 | 11/1981 | Shimizu | 57/251 |
| 4,300,343 | 11/1981 | Nakamura et al. | 57/251 |
| 4,470,941 | 9/1984 | Kurtz | 264/136 |
| 4,614,678 | 9/1986 | Ganga | 428/408 |
| 4,626,306 | 12/1986 | Chabrier et al. | 156/180 |
| 4,660,364 | 4/1987 | Chiang | 57/234 |
| 4,707,977 | 11/1987 | Cousin et al. | 57/297 |
| 5,102,584 | 4/1992 | Pavinen et al. | 264/1.5 |

FOREIGN PATENT DOCUMENTS

| | | |
|---|---|---|
| 125953 | 11/1984 | European Pat. Off. . |
| 226420 | 6/1987 | European Pat. Off. . |
| 300321 | 1/1989 | European Pat. Off. . |
| 330980 | 9/1989 | European Pat. Off. . |
| 58-138616 | 8/1963 | Japan . |

*Primary Examiner*—Charles T. Jordan
*Assistant Examiner*—Meena Chelliah
*Attorney, Agent, or Firm*—Oliff & Berridge, P.L.C.

[57] ABSTRACT

A process according to which filaments are embedded in a thermoplastic substance. The filaments pass through a chamber which is filled with a thermoplastic substance under pressure and made viscous by heating and the filaments run over a number of return members, thus having the effect of embedding the filaments in a matrix consisting of the thermoplastic. On leaving the chamber, the filaments pass through at least one die with the matrix in which they are embedded. The pseudo monofilament thus formed is subjected to a twist and is coated with a sheath of wear-resistant thermoplastic substance.

25 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS AND DEVICE FOR THE MANUFACTURE OF A STRING FOR STRINGING TENNIS RACKETS OR THE LIKE AND STRING RESULTING THEREFROM

BACKGROUND OF THE INVENTION

The present invention relates to a process for the manufacture of a string intended for stringing tennis rackets or the like, in which filaments are embedded in a thermoplastic substance. It also relates to a tennis string obtained by following this process and a device for implementing the process. A tennis string means a string intended for stringing tennis rackets or the like. A different use of this string is obviously not excluded.

A process of the abovementioned type is known from the document U.S. Pat. No. 4,707,977. A number of multiple strands consisting of monofilaments are combined in a die and a thermoplastic substance injected under pressure is injected onto and into this bundle of filaments so as to embed it in plastic. On leaving the die a twist is given to the bundle of filaments, it being possible for the string thus formed to pass again through a forming die before being cooled. It has been found, however, that the string thus formed does not yet satisfy all the requirements which are sought after, for example, in the case of a string intended for stringing a tennis racket, especially because of an insufficient bonding between the filaments and the plastic injected to embed them.

SUMMARY OF THE INVENTION

The invention is therefore intended to obtain an intimate bonding between the filaments and the plastic which embeds them, by a manufacturing process of the abovementioned type and at a low prime cost.

According to the process of the invention, the filaments pass through a chamber in which they run over a number of return bodies and which is filled with a thermoplastic substance under pressure and made viscous by heating, thus having the effect of embedding the filaments in a matrix consisting of this thermoplastic substance, on leaving the chamber the filaments pass through at least one die with the matrix in which they are embedded, the pseudo monofilament thus formed is subjected to a twist and is then coated with a sheath of wear-resistant thermoplastic substance. A tennis string is thus obtained, containing a high proportion of filaments and exhibiting an elongation/tension characteristic which is particularly favourable for the stringing of a tennis racket and resembling a gut string. Given that a die, at least can be precisely adapted to the number of monofilaments employed and that the latter are practically parallel to each other, a high proportion of filaments can be obtained in the pseudo monofilament obtained, by virtue of this process, the various filaments being very well embedded in the thermoplastic substance as a result of the multiple changes of direction to which they are subjected. Because of the twist and of the subsequent sheathing with a resistant plastic a tough final product is obtained which retains its form during the game of tennis or the like.

According to a preferred method of implementing this process, on leaving the first chamber the filaments in their matrix of thermoplastic substance pass successively through an intermediate die, a second chamber filled with heated thermoplastic substance and then an exit die. In this way it is possible to obtain, at the exit of the intermediate die, a pseudo monofilament which has a high proportion of filaments and then, by passing through the second chamber and the exit die, to deposit onto this pseudo monofilament a thin film of thermoplastic substance adhering perfectly to this pseudo monofilament. For this purpose, the last die is a few per cent larger in diameter than the intermediate die.

According to an advantageous embodiment of this process the pseudo monofilaments are wound onto a reel on leaving the die, this reel is placed on a rotating unwinder and the pseudo monofilament situated on it is unwound from the reel while applying thereto a rotation on two orthogonal axes, imparting the desired twist to the pseudo monofilament. This twist is advantageously from approximately 30 to 150 turns/m and preferably between 60 and 100 turns/m. During the twisting the pseudo monofilament advantageously passes through a heating tube where its matrix of thermoplastic substance and its outermost layer are heated and softened. This heating will be advantageously exploited to ensure an intimate bonding between the matrix and the subsequently extruded sheath. After the sheath extrusion, cooling and solidification of the matrix set the twist.

The length of pseudo monofilament to which the twist is applied is preferably limited by a combined system of a rotating roller brake and a stationary roller brake. The rotating roller brake is preferably situated upstream of the heating tube, while the stationary roller brake is preferably situated downstream of the heating tube.

The sheath can be produced with the same thermoplastic substance as the matrix in which the filaments are embedded, but it is preferably made of a substance which, depending on the use requirements of the string, is particularly tough, resistant to impacts, stable to light and insensitive to moisture, so as to make the string particularly resistant to stresses to which it is subjected, especially during the stringing of the racket or, subsequently during the game of tennis. The outer sheath preferably has a thickness of 0.05 to 0.1 mm so as to protect the filaments over the whole outer face of the pseudo monofilament, in order that the string shall retain its full strength, even under the effect of mechanical stresses.

BRIEF DESCRIPTION OF THE DRAWINGS

Other characteristics and advantages of the invention emerge from the detailed description which follows of an embodiment shown, by way of example without any limitation being implied, in the attached drawing, in which.

DETAILED DESCRIPTION OF PREFERRED EMBODIMENTS

Figure 1:
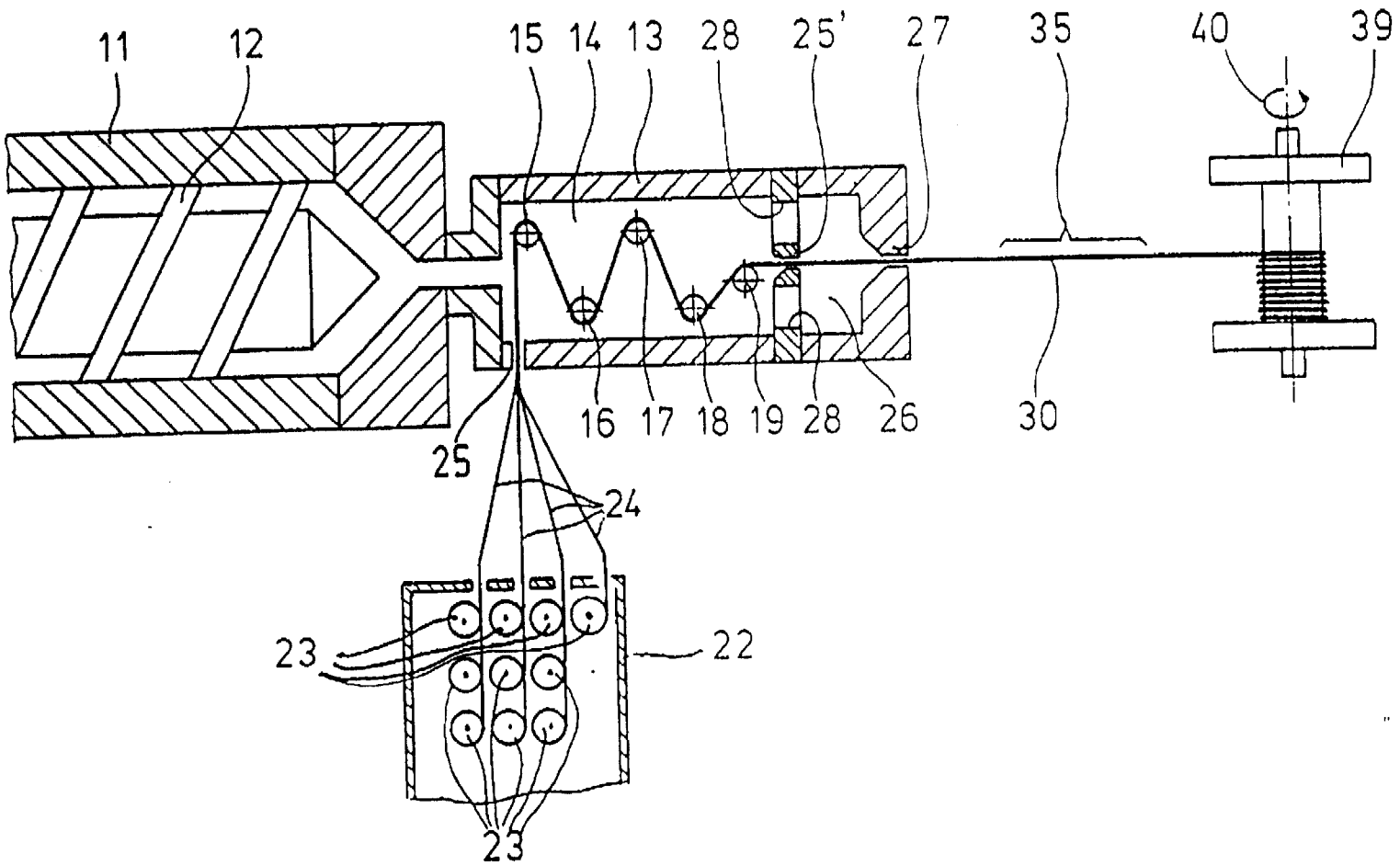
FIG. 1 is a view of the device for implementing the first stage of the process according to the invention.

FIG. 1 shows, on the left, an extruder 11 with an extruder screw 12 by means of which a thermoplastic substance originating from a hopper (not shown) can be injected into a tool 13 which has a closed chamber 14. The tool 13 is kept at a constant temperature of, for example, 150° C. by a thermostatic heating device (not shown). The extruder screw 12 maintains a pressure of, for example, 3 bar in the cavity 14. The thermoplastic substance employed may be, for example, a polyamide which has a low or intermediate viscosity at the controlled temperature.

In the chamber 14 there are, from the left towards the right in FIG. 1, for example, five return members 15 to 19. In this example, ten reels 23 of multiple strands 24 consisting of uncoated monofilaments are placed in a rack 22. The multiple strands 24 originating from the rack 22 enter, via a side opening 25, the chamber 14 of the tool 13. From the opening 25 these multiple strands 24 run, for example, successively towards the return member 15 by which they are diverted by approximately 160° towards the return member 16 by which they are diverted by approximately 140° towards the return member 17 by which they are diverted by 140° towards the return member 18 by which they are finally diverted by 140° towards the return member 19. These multiple changes in direction result in a fanning out of the multiple strands so that each constituent monofilament can be sheathed in an optimum manner by the mass of plastic in the chamber 14.

On leaving the last return member the multiple strands are directed towards a first die 25' which can also be referred to as the intermediate die and the purpose of which is to form a pseudo monofilament which contains a high proportion of filaments and a low proportion of the matrix in which these filaments are embedded. From the first die 25' the filaments pass through an outer chamber 26 in the direction of a second die 27 which may also be referred to as the last die and the purpose of which is also to form a pseudo monofilament 30 which contains a high proportion of filaments and a low proportion of the plastic matrix in which these filaments are embedded. In addition, the second die is intended to give the strand 30 a smooth surface. The chambers 14 and 26 are joined together by openings 28 and therefore contain the same molten plastic of low to intermediate viscosity. The temperature of this molten plastic is generally lower than the melting temperature of the monofilaments of the multiple strands 24. The temperature of the molten mass is chosen so as to ensure an intimate bonding between the matrix and the surface of the constituent monofilaments of the multiple strand.

It should be noted that, owing the diversion on the return members 15 to 19, the multiple strands 24 are flattened and fanned out, with the result that the monofilaments are in close contact with the molten plastic in the tool 13. The strands could also be diverted in a direction perpendicular to the plane of the drawing in FIG. 1 in order to further improve the contact with the molten mass, but it has been found that with the type of return shown an excellent contact has already been obtained between the various monofilaments and the molten plastic. At the exit of the last die 27 a strand 30 is obtained which although consisting of many separate monofilaments—has the appearance of a monofilament and this is why it referred to here as a pseudo monofilament.

Figure 3A:
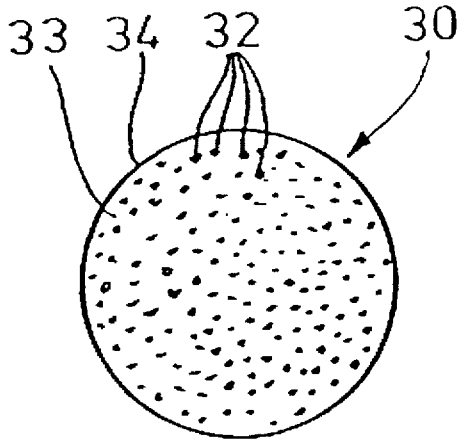
FIGS. 3A and 3B are, respectively, a sectional view of the pseudo monofilament such as can be manufactured during the first stage of the process according to the invention (FIG. 3A) and of the pseudo monofilament surrounded by an outer sheath (FIG. 3B), that is to say the finished tennis string as resulting from the second stage of the process according to the invention.

The last die 27 has, conveniently, a diameter which is a few hundredths of a millimeter, for example from 2 to 4%, greater than the intermediate die 25'; for example in one embodiment, the intermediate die 25' had a diameter of 1.2 mm and the last die 27 a diameter of 1.25 mm. It should be pointed that these dies are designed so as to leave only a thin layer of thermoplastic substance on the strand, outside, that is to say that, in a first stage of the process, the device of FIG. 1 makes if possible to produce a pseudo monofilament 30 such as is shown on a larger scale and very diagrammatically in FIG. 3A. It is essential that the individual monofilaments should be placed very close to the outer surface of the strand. The latter contains, for example, approximately 1,000 individual filaments 32 which have been embedded, in chambers 14 and 26, in a matrix of thermoplastic substance 33. The number of individual monofilaments is a function of the strength required in the tennis string and is generally between 700 and 2,800.

The filaments 32 may be made of polyethylene or polyamide, preferably polyamide 4-6, and their embedding or sheathing substance may be polyethylene, polypropylene, or polyamide, and preferably polyamide 4-6. The melting point of the plastic embedding matrix 33 is preferably less than that of the filaments 32. Finally, the proportion of filaments 32 which this string contains is advantageously approximately between 55 and 90% by weight.

If it is assumed, for example, that each of the ten multiple strands 24 contains approximately 140 monofilaments, the pseudo monofilament 30 contains approximately 1,400 monofilaments in all. On its outer face, the strand 30 (FIG. 3A) preferably has only a thin layer of plastic 34 which would be hardly sufficient to protect the outer monofilaments.

On leaving the last die 27 the pseudo monofilament 30 is cooled in the region 35, for example by a fan—not shown—and then wound onto a reel 39, as shown by the arrow 40. The reel 39 therefore contains the pseudo monofilament 30 with a thin outer layer 34 of thermoplastic substance.

Figure 2:
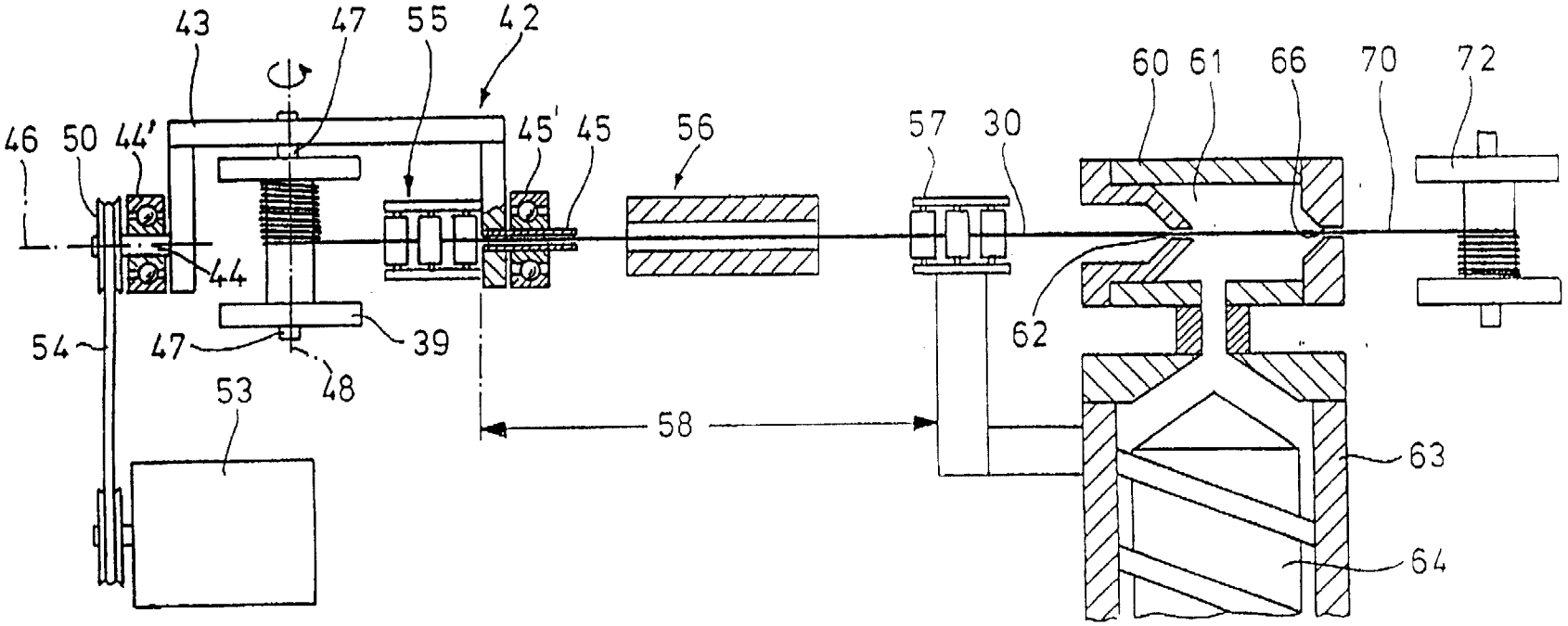
FIG. 2 is a view of a first embodiment of the device for implementing the second stage of the process according to the invention.

The reel 39 with the pseudo monofilament 30 is placed, as shown in FIG. 2, in rotating unwinder 42. In this embodiment which is shown here by way of example, this unwinder comprises a C-shaped stirrup provided with two rotary shafts 44, 45 and mounted in two ball bearings 44', 45', and which can therefore rotate about a lengthwise axis 46. Perpendicularly to this lengthwise axis 46, a spindle 47, which defines a transverse axis 48, is fastened to the stirrup 43. The reel 39 is mounted so that it rotates on this spindle 47, with the result that it can rotate about the lengthwise axis 46 and the transverse axis 48.

A pulley 50 mounted on the end of the shaft 44 can be driven in rotation by a motor 53 by means of a trapezoidal belt 54.

The shaft 45 is hollow, as shown, with the result that the pseudo monofilament 30 can pass through it. A roller brake 55 is mounted on the stirrup 43 so that it can rotate with it on the shaft 45. It prevents the twist of the strand 30 from being propagated to the reel 39.

As it leaves the hollow shaft 45, the pseudo monofilament 30 is guided through a heating tube 56 the purpose of which is to heat the plastic matrix 33 and the outer plastic layer 34 (FIG. 3A) so as to soften them. The heating tube 56 is followed, as shown, by a stationary roller brake 57 which is intended to limit to the region 58, situated between the two roller brakes 55 and 57, the twist which is imparted to the pseudo monofilament 30 by preventing it from being propagated towards the right in FIG. 2.

On leaving the stationary roller brake 57 the pseudo monofilament 30 which has received a twist of, for example, 70 turns/min and which has been heated through the heating tube 56 passes, through an entry opening 62, into a sheathing tool 60 whose chamber 61 is filled with a molten mass of polymer. The polymer is injected, by an extruder 63 provided with a screw 64, into the chamber 61, which is maintained at a temperature of, for example, 200° C. by a thermostatically controlled heating device—not shown. In this tool an intimate bonding is obtained between the plastic matrix 33—heated by the heating tube 56—and the molten polymer mass held in the sheathing tool 60. The temperature of the molten mass may be higher than the melting temperature of the multiple strands 24, one of the reasons being the relatively high speed of the strand 30 in this molten mass, which may be of the order of 100 m/min.

The sheathing tool 60 has an exit die 66 whose diameter is slightly greater than that of the pseudo-monofilament 30 which passes through it; for example this diameter may be 0.1 mm greater than the diameter of the strand 30, that is to say that when the latter has, for example, a diameter of between 1.2 and 1.25 mm, the diameter of the exit die 66 is, for example, 1.35 mm.

Figure 3B:
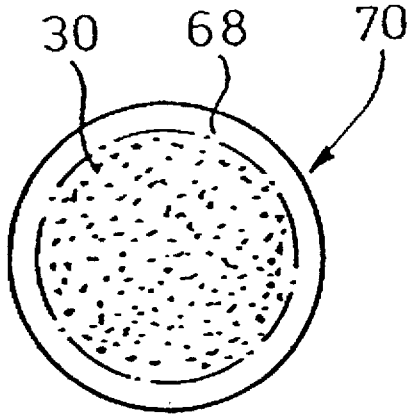

The molten polymer held in the chamber 61 is at a relatively high pressure which, depending on the polymer employed, is of the order of 2 to 100 bar and is typically approximately 60 bar. This is necessary because the sheathing employs a plastic of high viscosity which endows the sheath with the mechanical characteristics which it requires, that is to say better wear resistance and impact strength, and greater rigidity than the matrix of thermoplastic substance 33 in which the filaments 32 are embedded and which, in addition, is stable to light and insensitive to moisture. As shown in FIG. 3B, the pseudo monofilament 30 is therefore coated, in the chamber 61, with a sheath 68 made of this polymer and whose thickness is of the order of 0.05 to 0.1 mm. Its shape and its thickness are determined by the exit die 66, from which the finished tennis string 70 therefore comes out and—after suitable cooling—is wound onto a reel 72.

It is generally found that the filaments of the finished string which are embedded in a plastic matrix, prestressed, exhibit a very small loss in tension, because the prestressing is in practice set irreversibly by the mass of plastic.

Only a single plastic string which has a single pseudo monofilament used as its core has been considered in the above description. It is also possible, however, to twist together a number of pseudo monofilaments and to provide them with a common sheath. It is also possible in this case to plait strands of different colours.

Examples of tennis strings according to the invention are shown below:

EXAMPLE 1

Ten multiple strands 24 are employed, all of which contain 144 filaments each at 940 dTex of polyamide 4.6 (melting point temperature approximately 290° C.). A suitable polyamide 4.6 which can be used is sold under the name "Stanyl" by the company DSM, and has a glass transition temperature of 82° C., a Young modulus of 34 g/d. In the chamber 14 these filaments are diverted five times and pass, at a speed of 1 m/min, through a melt of polyamide EMS D 590 G in which they are embedded. This melt is maintained at a temperature of 180° C. and a pressure of 2 bar. On leaving the last die, the pseudo monofilament 30 has an external diameter of 1.25 mm and a proportion of filaments of approximately 70% by weight.

Figure 4:
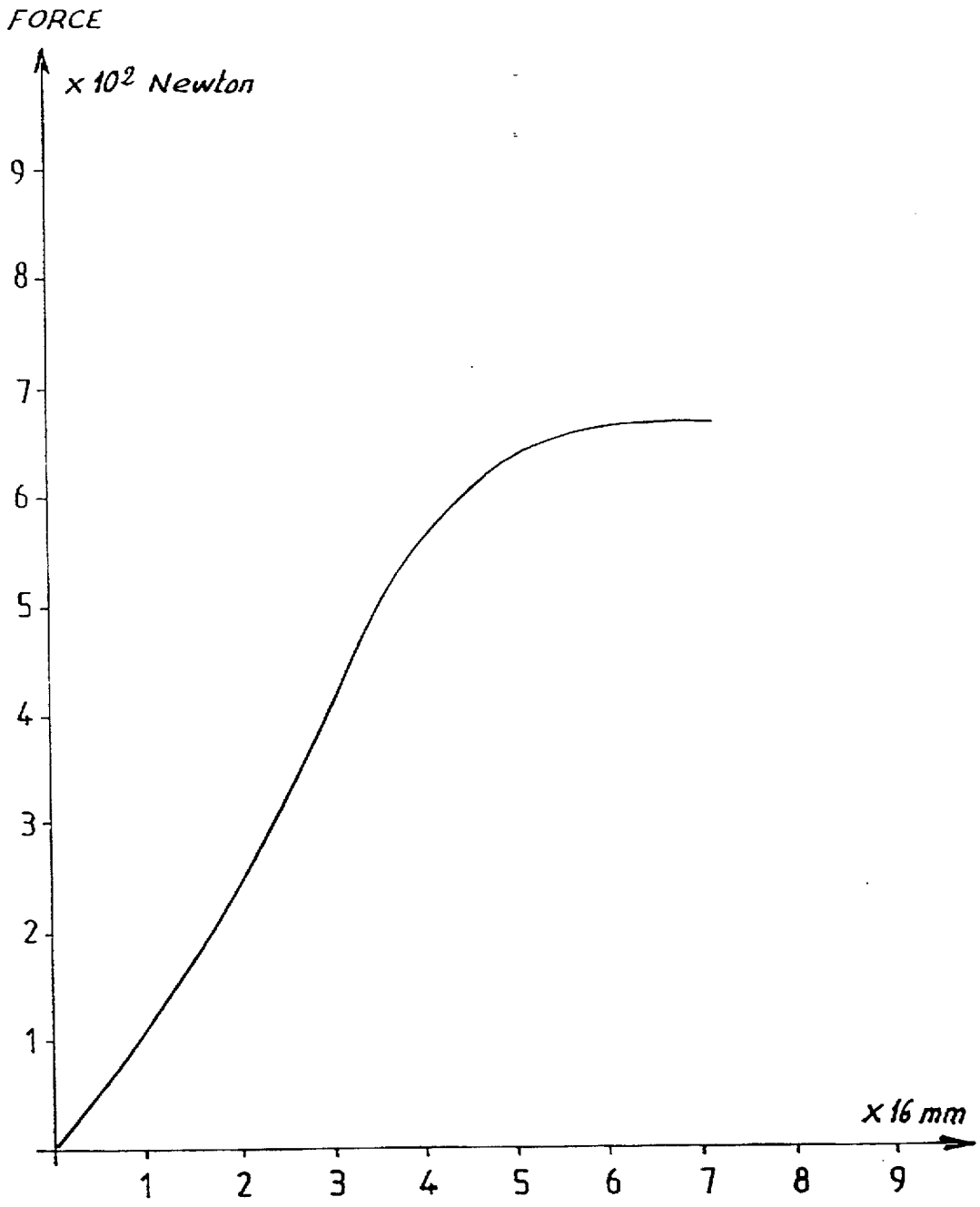
FIG. 4 is a diagram which shows the elongation/tension characteristic of a tennis string obtained by implementing the process according to the invention.
Figure 5:
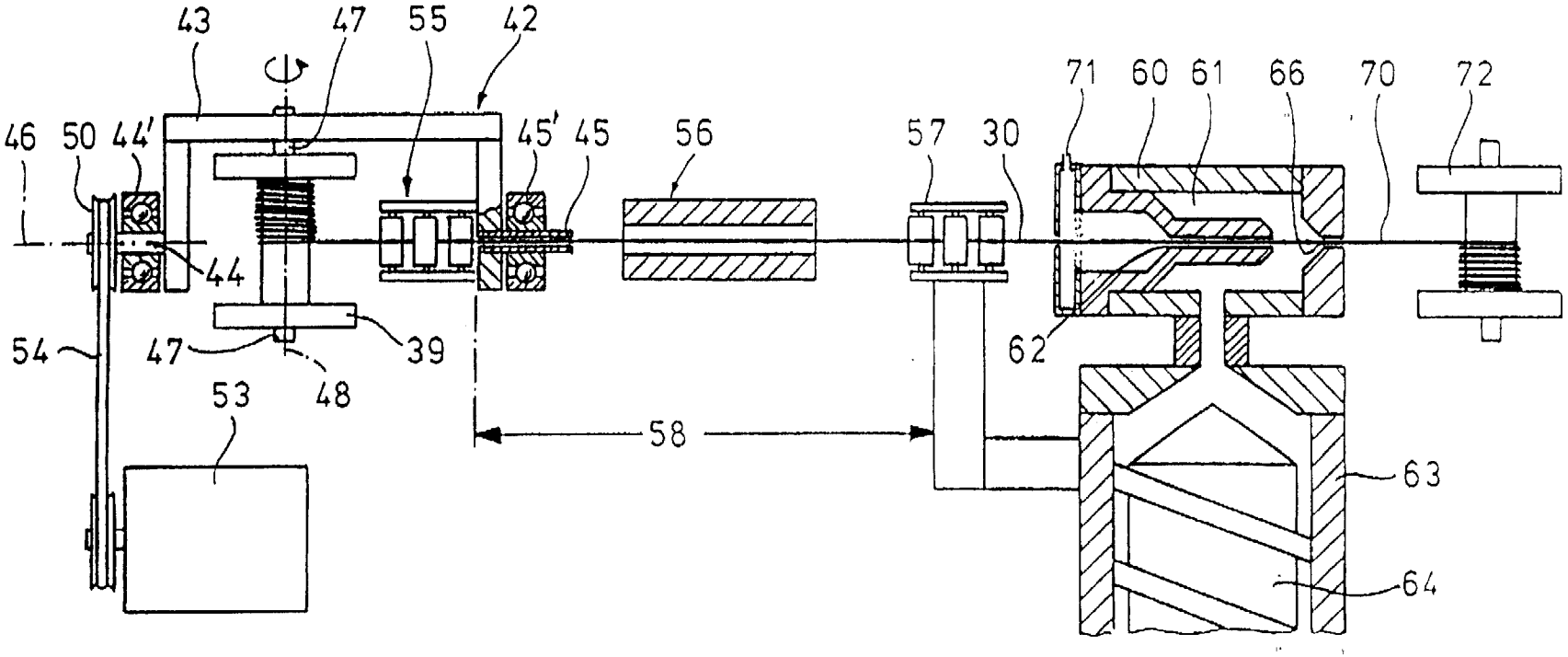
FIG. 5 is a view of a second embodiment of the device for implementing the second stage of the process according to the invention.

In the device of FIG. 2 the pseudo monofilament 30 is subjected to a twist of 80 turns/min and, in the sheathing tool 60, it passes at a speed of 2 m/min through a polymer melt of polyamide B35 BASF, maintained at 300° C. at a pressure of 10 bar. On leaving the exit die 66 the final product 70 has an outer diameter of approximately 1.35 mm. It has a tensile strength of about 66 daN. Its characteristic elongation/tension curve 80 is shown in FIG. 4.

EXAMPLE 2

A core is employed which has been manufactured according to the same process as in Example 1.

The device described with reference to FIG. 2 is modified in the case of this process, in so far as the tool 60 is used in combination with a vacuum chamber 71 through which the strand 30 passes before entering the chamber 61 filled with the molten polymer.

The pseudo monofilament 30 is subjected to a twist of approximately 70 turns/m and passes through the sheathing tool 60 at a speed of approximately 40 m/min. A sheath is then deposited onto the pseudo monofilament, which is applied firmly to the core, owing to the reduced pressure prevailing in the vacuum chamber, and which bonds to it. In this exemplary of embodiment and in contrast to the exemplary embodiments described above, the core and the sheath are therefore no assembled by cohesion or adhesiveness. The polymer melt, Ultramide B35, is maintained at a temperature of approximately 245° C. The finished product has a final diameter of 1.35 to 1.4 mm.

Within the scope of the invention the filaments may be, for example, made of polyester, polyamide, particularly polyamide 4.6, aramid, polyimide and polyetherketone.

The plastic for embedding the filaments (in the chamber 14, 26) may be, for example, made of polyamide, particularly polyamide 4.6, copolyamide, polyester, polyurethane, hot melt adhesive and elastomer.

The plastic for manufacturing the sheath 68 may be, for example, made of polyamide, particularly polyamide 4.6, copolyamide, polyester, polyurethane, elastomer and polyacetal.

It should be pointed out very particularly that a tennis string according to the invention retains its shape; for example when it is slightly flattened under the effect of a stress, it regains its initial shape, circular in cross-section, after the stress is released.

Since the thermoplastic substance employed for the sheath 68 is other than that for the matrix 33, it is possible, in each case, to use plastics which are the best for the purpose in question. In particular, a substance of high melting point, which has the necessary strength, may be employed for the sheathing plastic.

Various alternative forms and modifications are obviously possible within the scope of the invention.

I claim:

1. A process for the manufacture of a tennis string intended for stringing rackets in which filaments are embedded in a thermoplastic substance, wherein the filaments pass through a chamber filled with the thermoplastic substance under pressure and made viscous by heating in which the filaments run over a number of return members, thus having the effect of embedding the filaments in a matrix consisting of the thermoplastic substance, on leaving the chamber the filaments pass through at least one die with the matrix in which they are embedded, thus forming a pseudo monofilament that is subjected to a twist and is coated with a sheath of wear-resistant thermoplastic substance.

2. The process according to claim 1, wherein on leaving the chamber the filaments embedded in the matrix pass successively through a first die, a second chamber filled with the heated thermoplastic substance and finally a second die prior to twisting.

3. The process of claim 1, wherein the pseudo monofilament is wound onto a reel on leaving the at least one die said reel is placed in a rotating unwinder which is used to rotate said reel about its lengthwise axis and about a transverse axis perpendicular to the lengthwise axis, the pseudo monofilament situated thereon is unwound from the reel while applying thereto a rotation about the two above-mentioned orthogonal axes of rotation, which imparts the desired twist to the pseudo monofilament.

4. The process according to claim 3, wherein the pseudo monofilament is subjected to a twist of 30 to 150 turns/m.

5. The process of claim 3, wherein a twist of 60 to 100 turns/m is applied.

6. The process according to claim 4, wherein during the twist the pseudo monofilament passes through a heating tube.

7. The process according to claim 3, wherein the action of twisting the pseudo monofilament occurs over a length of the pseudo monofilament between a roller brake rotating with the unwinder and a stationary roller brake.

8. The process according to claim 1, wherein filaments (32) are employed made of plastic of one of the group consisting of polyester, polyamide, polyamide 4.6, aramid, polyimide, polyester ketone and polyethylene.

9. The process according to claim 1, wherein a plastic of one of the group consisting of polyamide, polyamide 4.6, copolyamide, polyester, polyurethane, polyethylene, polypropylene, hot melt adhesives and elastomers is employed for at least one of embedding the filaments (32) and sheathing the pseudo monofilament (30).

10. The process according to claim 1, wherein a melting point of the embedding matrix is lower than that of the filaments.

11. The process of claim 1, wherein a melting point of the embedding matrix is approximately equal to that of the filaments.

12. The process according to claim 1, wherein a melting point of the thermoplastic substance forming the sheath is lower than that of the filaments.

13. A tennis string obtained by the process according to claim 1.

14. The tennis string according to claim 13, wherein the proportion of filament is approximately between 55 and 90% by weight.

15. The tennis string according to claim 13, wherein the number of pseudo monofilaments is approximately between 700 and 2,800.

16. A device for manufacturing a tennis string, comprising: a chamber intended to receive a thermoplastic substance made viscous by heating and containing return members to divert filaments a number of times within the viscous plastic and embedding the filaments in a matrix consisting of the thermoplastic material; and at least one die downstream from said chamber for forming a pseudo monofilament.

17. The device according to claim 16, wherein at an exit of the chamber is arranged for the filaments embedded in the plastic to pass therethrough.

18. The device according to claim 17, wherein a first die and a second die are arranged at the exit of the chamber.

19. The device according to claim 18, wherein the diameter of the second die is slightly greater than that of the first die.

20. The device according to claim 16, further comprising a rotating unwinder which allows a reel containing the pseudo monofilament to be rotated about its lengthwise axis and about a transverse axis perpendicular to the lengthwise axis and in that this rotating unwinder is also provided with a roller brake rotating therewith, in order to limit a twisting action on said pseudo monofilaments to a length situated downstream of the roller brake.

21. The device according to claim 20, wherein a stationary roller brake is provided, arranged at a certain distance from the rotating roller brake.

22. The device according to claim 20, wherein downstream of the rotating unwinder, a sheathing tool is provided for sheathing the pseudo monofilament with an outer sheath of good mechanical strength.

23. The device according to claim 22, wherein the sheathing tool has a chamber for receiving a molten polymer, an entry opening and an exit die.

24. The device according to claim 23, wherein a vacuum chamber is used in combination with the sheathing tool.

25. The device according to claim 18, wherein a diameter of the second die is greater than that of the first die by 2%–6%.

* * * * *